(12) United States Patent
Hattori et al.

(10) Patent No.: US 8,475,613 B2
(45) Date of Patent: Jul. 2, 2013

(54) BONDING AGENT, ALUMINUM NITRIDE COMPOSITE BODY, AND MANUFACTURING METHOD OF THE SAME

(75) Inventors: Akiyoshi Hattori, Handa (JP); Takahiro Takahashi, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 561 days.

(21) Appl. No.: 12/434,069

(22) Filed: May 1, 2009

(65) Prior Publication Data

US 2009/0242101 A1 Oct. 1, 2009

Related U.S. Application Data

(62) Division of application No. 11/251,563, filed on Oct. 14, 2005, now abandoned.

(30) Foreign Application Priority Data

Nov. 16, 2004 (JP) .................................. 2004-332377
Aug. 12, 2005 (JP) .................................. 2005-234999

(51) Int. Cl.
| | |
|---|---|
| *C03B 29/00* | (2006.01) |
| *C04B 33/34* | (2006.01) |
| *C04B 37/00* | (2006.01) |
| *B32B 37/00* | (2006.01) |
| *B32B 9/00* | (2006.01) |
| *B29C 65/00* | (2006.01) |

(52) U.S. Cl.
USPC ............... 156/89.11; 156/89.27; 156/242; 156/277; 156/281; 156/325; 428/698

(58) Field of Classification Search
USPC ............................................ 156/89.27, 89.11
See application file for complete search history.

(56) References Cited

U.S. PATENT DOCUMENTS

| | | | | |
|---|---|---|---|---|
| 5,409,869 | A * | 4/1995 | Ueno et al. ............... | 501/98.4 |
| 5,804,289 | A * | 9/1998 | Wakamatsu ............. | 428/212 |
| 6,200,373 | B1 * | 3/2001 | Bates et al. ............... | 501/98.5 |
| 6,261,708 | B1 * | 7/2001 | Ohashi et al. ............ | 428/698 |
| 2004/0206273 | A1 | 10/2004 | Hermansson et al. | |

FOREIGN PATENT DOCUMENTS

| | | |
|---|---|---|
| JP | 08-073280 | 3/1996 |
| JP | 10-167850 | 6/1998 |
| JP | 10-273370 | 10/1998 |

OTHER PUBLICATIONS

K. Geetha et al., Ceramic Joining Through Reactive Wetting of Alumina with Calcium Aluminate Refractory Cements) Bull. Mater. Sci., vol. 23, No. 4, Aug. 2000, pp. 243-248.

* cited by examiner

*Primary Examiner* — Philip Tucker
*Assistant Examiner* — Alex Efta
(74) *Attorney, Agent, or Firm* — Burr & Brown

(57) ABSTRACT

A bonding agent is provided which includes a flux containing either calcium aluminate or calcium oxide and aluminum oxide and aluminum nitride powder.

6 Claims, 5 Drawing Sheets

BONDING AGENT, ALUMINUM NITRIDE COMPOSITE BODY, AND MANUFACTURING METHOD OF THE SAME

CROSS REFERENCE TO RELATED APPLICATIONS

This application is a divisional application of U.S. application Ser. No. 11/251,563, filed Oct. 14, 2005, now abandoned, and claims the benefit of priority from prior Japanese Patent Application No. P2004-332377, filed on Nov. 16, 2004, and No. P2005-234999, filed on Aug. 12, 2005; the entire contents of which are incorporated herein by reference.

BACKGROUND OF THE INVENTION

1. Field of the Invention

The present invention relates to a bonding agent to bond a plurality of aluminum nitride sintered bodies, an aluminum nitride composite body, and a method of manufacturing the same.

2. Description of the Related Art

Conventional methods to bond aluminum nitride sintered bodies to each other include a solid state bonding method and a solid-liquid state bonding method. In the solid state bonding method, a bonding agent is interposed between the aluminum nitride sintered bodies, and bonding is performed in a state where the bonding agent is not melted, that is, the bonding agent is solid. The solid state bonding can provide good bonding by heating at a high bonding temperature of 1850° C. or more (for example, see Patent Literature 1).

In the solid-liquid state bonding method, a bonding agent is interposed between the aluminum nitride sintered bodies, and bonding is performed in a state where part of the bonding agent is melted and solid and liquid are mixed. Some types of the solid-liquid state bonding method can provide good bonding by using a flux containing 25 to 45 wt % calcium oxide, 5 to 30 wt % yttrium oxide, and balance aluminum oxide and heating the aluminum nitride sintered bodies at a bonding temperature of 1650 to 1800° C. (for example, see Patent literatures 2 and 3).

Moreover, a heater including a heating element and an electrostatic chuck including an electrode are manufactured using the above described bonding methods. The heater and electrostatic chuck are used in a corrosive gas environment.
Patent Literature 1: Japanese Patent Laid-open Publication No. 8-73280
Patent Literature 1: Japanese Patent Laid-open Publication No. 10-167850
Patent Literature 1: Japanese Patent Laid-open Publication No. 10-273370

However, the solid state bonding method requires heating to a high temperature of 1850° C. or more in order to obtain good bonding. Moreover, in the solid-liquid state bonding method using the flux containing 25 to 45 wt % calcium oxide, 5 to 30 wt % yttrium oxide, and balance aluminum oxide, the bonding temperature can be set lower than that of the solid state bonding. However, heating to 1650 to 1800° C. is required in order to obtain good bonding. As described above, the bonding temperature is high in either conventional bonding method, therefore the aluminum nitride sintered bodies might be deformed by bonding.

Moreover, when the bonding is performed in a manufacturing process of the heater or electrostatic chuck, the heating element or electrodes might change in quality or the volume resistivity might change due to the high bonding temperature. This might result in degradation of properties including temperature uniformity of the heater and uniformity of chucking force of the electrostatic chuck.

Furthermore, the high bonding temperature increases energy required for bonding or requires processing again after bonding due to deformation, thus increasing manufacturing costs.

SUMMARY OF THE INVENTION

An object of the present invention is to provide a bonding agent for aluminum nitride sintered bodies which is capable of providing good bonding at low bonding temperature, an aluminum nitride composite body, and a method of manufacturing the same.

A bonding agent according to the present invention includes a flux and aluminum nitride powder. The flux contains either calcium aluminate or calcium oxide and aluminum oxide and contains less than 5 wt % rare-earth elements. Such a bonding agent can provide good bonding at a low bonding temperature of 1500° C. or less.

The calcium aluminate can contain, for example, at least one of $Ca_{12}Al_{14}O_{33}$ and $Ca_3Al_2O_6$.

Preferably, the flux contains 30 to 80 wt % calcium and 20 to 70 wt % aluminum. Preferably, the flux contains 0.01 to 5 wt % silica. Moreover, in the bonding agent, the content of the flux is 10 to 90 wt % and the content of the aluminum nitride powder is 10 to 90 wt %. More preferably, maximum particle diameters of the flux and the aluminum nitride powder are 45 µm or less.

An aluminum nitride composite body according to the present invention includes a plurality of aluminum nitride sintered bodies and a bonding layer formed between each adjacent pair of the plurality of aluminum nitride sintered bodies. The bonding layer contains nitrogen, oxygen, aluminum and calcium and contains less than 15 wt % rare-earth elements. The plurality of aluminum nitride sintered bodies are bonded through the bonding layer. Such an aluminum nitride composite body can be obtained at a low bonding temperature of 1500° C. or less, thus resulting in small deformation of the aluminum nitride sintered bodies and good bonding.

Preferably, the bonding layer contains 15 to 30 wt % nitrogen, 10 to 35 wt % oxygen, 20 to 55 wt % aluminum, and 5 to 20 wt % calcium.

Moreover, the aluminum nitride composite body can be used in a heater including a heating element or an electrostatic chuck including an electrode. Such an aluminum nitride composite body can be obtained at a low bonding temperature of 1500° C. or less. Accordingly, the heating element and the electrode do not change in nature, and the volume resistivity thereof scarcely changes at bonding. Such heater and electrostatic chuck have therefore excellent capabilities.

A method of manufacturing an aluminum nitride composite body includes: heating a plurality of aluminum nitride sintered bodies with a bonding agent interposed therebetween at a bonding temperature of 1500° C. or less to melt the bonding agent; and bonding the plurality of aluminum nitride sintered bodies to each other. The bonding agent contains a flux and aluminum nitride powder, and the flux contains either calcium aluminate or calcium oxide and aluminum oxide and contains less than 5 wt % rare-earth elements. Such a manufacturing method can provide good bonding at a low temperature of 1500° C. or less and reduce deformation of the aluminum nitride sintered bodies.

Preferably, the plurality of aluminum nitride sintered bodies with the bonding agent interposed therebetween are heated to the bonding temperature at a heating rate of 0.5 to 10.0° C./min. Preferably, an average surface roughness of a bonding surface of each of the aluminum nitride sintered bodies is 0.1 to 2.0 μm.

According to the present invention, it is possible to provide a bonding agent for the aluminum nitride sintered bodies which is capable of providing good bonding at low bonding temperature, an aluminum nitride composite body, and a method of manufacturing the same.

DETAILED DESCRIPTION OF THE INVENTION

[Bonding Agent]

Figure 1:
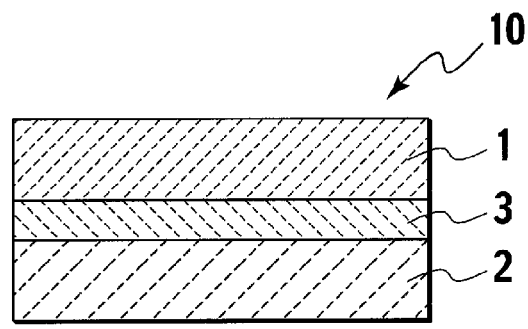
FIG. 1 is a cross-sectional view showing an aluminum nitride composite body according to an embodiment of the present invention.

A bonding agent is used to bond a plurality of aluminum nitride sintered bodies to each other. Bonding using the bonding agent of an embodiment is performed at a low bonding temperature of 1500° C. or less. The bonding agent contains a flux and aluminum nitride (AlN) powder. The flux is melted by heating at the bonding temperature.

The flux contains either calcium aluminate ($Ca_xAl_yO_z$) or calcium oxide (CaO) and aluminum oxide ($Al_2O_3$). In other words, the flux contains at least calcium aluminate or contains both calcium oxide and aluminum oxide. Specifically, the flux contains only calcium aluminate; contains calcium aluminate and calcium oxide; contains calcium aluminate and aluminum oxide; contains calcium aluminate, calcium oxide, and aluminum oxide; or contains calcium oxide and aluminum oxide.

The flux can contain, as calcium aluminate ($Ca_xAl_yO_z$), at least one of $Ca_{12}Al_{14}O_{33}$ (x=12, y=14, z=33) and $Ca_3Al_2O_6$ (x=3, y=2, z=6). Specifically, as calcium aluminate, the flux may contain only $Ca_{12}Al_{14}O_{33}$, may contain only $Ca_3Al_2O_6$, or may contain both $Ca_{12}Al_{14}O_{33}$ and $Ca_3Al_2O_6$. Moreover, in addition to $Ca_{12}Al_{14}O_{33}$ and $Ca_3Al_2O_6$, the flux may contain calcium aluminate with a phase other than those of $Ca_{12}Al_{14}O_{33}$ and $Ca_3Al_2O_6$.

The content of rare-earth elements in the flux is set to less than 5 wt %. When the content of rare-earth elements, such as yttrium, in the flux is 5 wt % or more, the aluminum nitride sintered bodies cannot be bonded at a bonding temperature of 1500° C. or less. Even if the aluminum nitride sintered bodies can be bonded, the strength at a bonded portion is low, and good bonding cannot be obtained. More preferably, the flux does not contain rare-earth elements.

The flux can contain alkali metal oxides, alkaline-earth metal oxides, and oxides such as a glass forming material. Examples of the glass forming material which can be contained are silica ($SiO_2$), boron oxide ($B_2O_3$), phosphorous oxide ($P_2O_3$), and the like. For example, adding a little amount of silica to the flux can further lower the bonding temperature without reducing thermal cycle endurance and corrosion resistance. When the bonding agent is used to manufacture an aluminum nitride composite body for use in a corrosive gas environment, it is preferable that the content of silica in the flux is 10 wt % or less. The content of silica of 10 wt % or less allows the corrosion resistance to the corrosive gas to be maintained. More preferably, the content of silica is 0.01 to 5 wt %. This can lower the bonding temperature and increase the strength of the bonded portion while maintaining the endurance and corrosion resistance.

The total content of oxides in the flux other than the oxide containing at least one of calcium and aluminum is, preferably, less than 20 wt % and, more preferably, 10 wt % or less. Still more preferably, the flux does not contain oxides other than the oxide containing at least one of calcium and aluminum.

Preferably, the flux contains 30 to 80 wt % calcium and 20 to 70 wt % aluminum. Such contents of calcium and aluminum can increase the strength of the bonded portion. More preferably, the flux contains 45 to 70 wt % calcium and 30 to 55 wt % aluminum.

The purity of the aluminum nitride powder is preferably 95% or more and, more preferably, 99% or more. This can reduce the influence of impurities and can provide good bonding.

Preferably, the bonding agent contains 10 to 90 wt % of the flux and 10 to 90 wt % of the aluminum nitride powder. Such contents of the flux and aluminum nitride powder can reduce a difference in thermal expansion between the aluminum nitride sintered bodies and the bonding agent and can leave a proper amount of the flux at the bonded portion. It is therefore possible to increase the strength and air tightness of the bonded portion. Accordingly, the bonding agent obtained by mixing the flux and aluminum nitride powder contains, preferably, 3 to 69 wt % calcium and 31 to 97 wt % aluminum. More preferably, the bonding agent contains 40 to 80 wt % of the flux and 20 to 60 wt % of the aluminum nitride powder.

Preferably, maximum particle diameters of the flux and aluminum nitride powder are 45 μm or less. This can increase the strength and air tightness of the bonded portion. More preferably, the maximum particle diameters of the flux and aluminum nitride powder are 32 μm or less.

[Aluminum Nitride Composite Body]

As shown in FIG. 1, the aluminum nitride composite body 10 according to the embodiment includes a plurality of aluminum nitride sintered bodies 1 and 2 and a bonding layer 3 formed between the plurality of aluminum nitride sintered bodies 1 and 2. The bonding layer 3 contains nitrogen (N), oxygen (O), aluminum (Al), and calcium (Ca), and the content of rare-earth elements is less than 15 wt %. Such aluminum nitride composite body 10 can be manufactured at a low bonding temperature of 1500° C. or less, thus resulting in less deformation of the aluminum nitride sintered bodies 1 and 2 and good bonding.

The bonding layer 3 can contain oxides of alkali metal, alkaline earth metal, a glass forming material, and the like. As the oxides of the glass forming material, for example, $SiO_2$, $B_2O_3$, $P_2O_3$, or the like can be contained. When the aluminum nitride composite body is used in the corrosive gas environment, the content of silica in the bonding layer 3 is preferably 10 wt % or less. The content of silica of 10 wt % or less allows the corrosion resistance to the corrosive gas to be maintained.

Among the oxides contained in the bonding layer 3, the total content of the oxides other than the oxide containing at least one of calcium and aluminum is, preferably, less than 20 wt % and, more preferably, 10 wt % or less.

Preferably, the bonding layer 3 contains 15 to 30 wt % nitrogen, 10 to 35 wt % oxygen, 20 to 55 wt % aluminum, and 5 to 20 wt % calcium. Such a composition of the bonding layer 3 can increase the strength and air tightness of the bonded portion. The bonding layer 3 can contain, for example, a compound N—O—Al—Ca, a compound N—O—Al—Ca—X (X is a rare-earth element), calcium oxide, aluminum oxide, calcium aluminate, and the like.

The bonding layer 3 has a thickness of, preferably, 1 to 150 μm and, more preferably, 3 to 100 μm. The maximum particle diameter of aluminum nitride in the bonding layer 3 is, preferably, 45 μm or less and, more preferably, 32 μm or less. This can increase the strength and air tightness of the bonded portion.

Purities of the aluminum nitride sintered bodies 1 and 2 are, preferably, 85% or more and, more preferably, 90% or more. This can reduce the influence of impurities.

Average particle diameters of the aluminum nitride sintered bodies 1 and 2 are, preferably, 0.5 to 15.0 μm and, more preferably, 0.5 to 5.0 μm. Densities of the aluminum nitride sintered bodies 1 and 2 are, preferably, 3.00 to 3.35 g/cm$^3$ and, more preferably, 3.10 to 3.35 g/cm$^3$. This can increase the strength of the aluminum nitride composite body 10.

Four point flexural strength (JIS R1601) of the aluminum nitride composite body 10 at room temperature is, preferably, 250 MPa or more and, more preferably, 300 Mpa or more.

Figure 2:
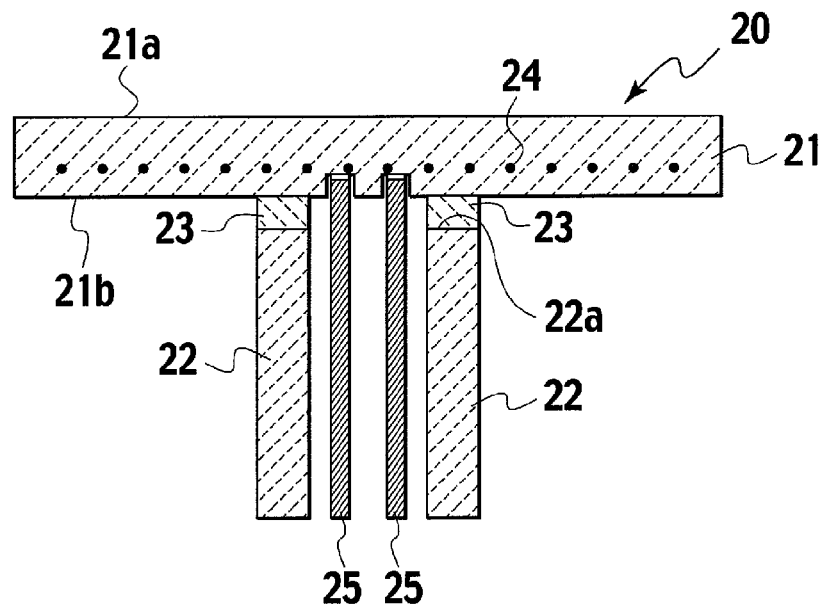
FIG. 2 is a cross-sectional view of a heater according to the embodiment of the present invention.

The aluminum nitride composite body 10 can be used in a heater 20 including a heating element 24 as shown in FIG. 2. The heater 20 is formed of an aluminum composite body including a disk member (plate) 21 and a pipe member (shaft) 22 bonded to each other with a bonding layer 23 interposed therebetween.

The disk member 21 is formed of an aluminum nitride sintered body. The disk member 21 includes a placement surface 21a where a semiconductor substrate (wafer) is placed and a back surface 21b opposite to the placement surface 21a. The disk member 21 includes the heating element 24 inside. As the heating element 24, a resistance heating element of molybdenum (Mo), tungsten (W), or the like can be used. The heating element 24 can be wire-shaped coil-shaped, mesh-shaped, sheet-shaped, and bulk-shaped.

The pipe member 22 is formed of an aluminum nitride sintered body. The pipe member 22 supports the disk member 21 and accommodates power supply members 25 inside a pipe. The pipe member 22 is attached to the back surface 21b of the disk member 21 with the bonding layer 23 interposed therebetween. The power supply members 25 supply electric power to the heating element 24. Ends of the power supply members 25 are connected to terminals of the heating element 24 by brazing or the like.

The bonding layer 23 contains nitrogen, oxygen, aluminum, and calcium, and the content of rare-earth elements is suppressed to less than 15 wt %. The bonding layer 23 bonds the back surface 21b of the disk member 21 and an end surface of the pipe member 22.

Figure 3:
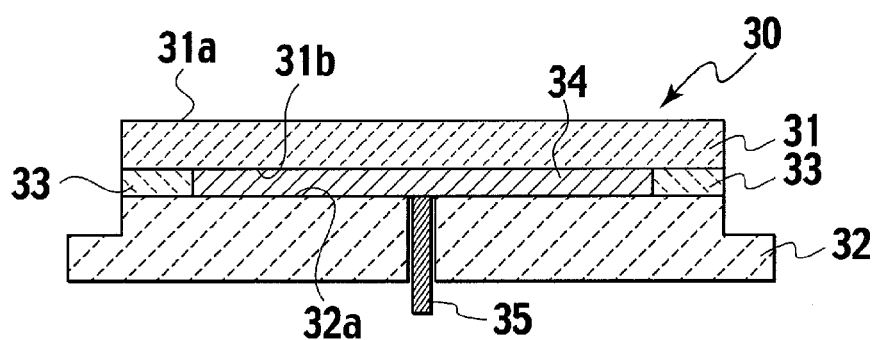
FIG. 3 is a cross-sectional view of an electrostatic chuck according to the embodiment of the present invention.

Moreover, an electrostatic chuck 30 including an electrode 34 as shown in FIG. 3 can be manufactured using the aluminum nitride composite body 10. The electrostatic chuck 30 includes a dielectric layer 31 and a base 32 with a bonding layer 33 interposed therebetween.

The dielectric layer 31 and base 32 are made of aluminum nitride sintered bodies. The dielectric layer 31 includes a placement surface 31a where a semiconductor substrate (wafer) is placed and a back surface 31b opposite to the placement surface 31a. The dielectric layer 31 and base 32 are bonded to each other with the electrode 34 interposed therebetween through the bonding layer 33.

The electrode 34 can be made of a high-melting point metal such as molybdenum (Mo) and tungsten (W). The electrode 34 can be hemispherical, comb-shaped, ring-shaped, mesh-shaped, or bulk-shaped. The electrode 34 is connected to a terminal 35 by brazing or the like.

The bonding layer 33 contains nitrogen, oxygen, aluminum, and calcium, and the content of rare-earth elements is suppressed to 15 wt %. The bonding layer 33 bonds the back surface 31b of the dielectric layer 31 and an upper surface 32a of the base 32. The bonding layer 33 is provided so as to fill a gap between the dielectric layer 31 and the base 32 around the electrode 34.

Using the aluminum nitride composite body, it is possible to manufacture a substance including pipe-shaped aluminum nitride sintered bodies bonded to each other, a substance including disk-shaped or plate-shaped aluminum nitride sintered bodies bonded to each other, and an electrostatic chuck which includes a heating element and an electrode and can perform heating, shapes and applications of which are not limited.

[Manufacturing Method]
(Bonding Agent)

First, compounds (source of calcium aluminate) for generating at least calcium aluminate are measured and mixed. The compounds as the calcium aluminate source can be calcium compounds such as calcium oxide, calcium carbonate ($CaCO_3$), and calcium hydroxide ($Ca(OH)_2$) and aluminum compounds such as aluminum oxide and aluminum hydroxide ($Al(OH)_3$). These calcium compounds and aluminum compounds also serve as the calcium oxide source and the aluminum oxide source, respectively. Preferably, the flux is prepared by mixing and melting the compounds such that the content of the calcium compound is 30 to 70 wt % (calcium oxide equivalent) and the content of the aluminum compound is 30 to 70 wt % (aluminum oxide equivalent).

Furthermore, if necessary, the compounds as sources for the alkali metal oxide, alkaline earth metal oxide, and oxide of the glass forming material which can be added may be measured and mixed. The compounds as the sources for the alkali metal oxide, alkaline earth metal oxide, and oxide of the glass forming material can be hydroxides, oxides, and the like of alkali metal, alkaline earth metal, and an element contained in the glass forming material.

The mixed compounds are heated at 1400 to 1600° C. to be melted, then cooled, and crushed to obtain the flux. The thus obtained flux contains at least calcium aluminate. The flux further contains, depending on the mixed compounds mixed, heating temperature and time, and the like, calcium oxide, aluminum oxide, alkali metal oxide, alkaline earth metal oxide, the glass forming material, or the like. The flux contains at least one of $Ca_{12}Al_{14}O_{33}$ and $Ca_3Al_2O_6$ as the calcium aluminate.

Alternatively, calcium oxide and aluminum oxide may be measured and mixed to prepare the flux containing calcium oxide and aluminum oxide. In this case, it is preferable to mix calcium oxide and aluminum oxide at a ratio of 30 to 70 wt % calcium oxide to 30 to 70 wt % aluminum oxide.

In any case, the flux preferably contains 30 to 80 wt % calcium and 20 to 70 wt % aluminum. The thus obtained flux and the aluminum nitride powder are measured and mixed to obtain the bonding agent.

(Aluminum Nitride Sintered Body)

The aluminum nitride powder and, if necessary, a sintering auxiliary agent are measured, and a binder is added thereto and mixed. The obtained mixture is molded by a molding method such as CIP (Cold Isostatic Pressing), slip casting, die molding, or the like. In the case of manufacturing the heater 20 shown in FIG. 2, the heating element 24 is embedded in a compact. For example, a preform is formed by using the mixture, the heating element 24 is placed on the upper surface of the preform, and the mixture is filled over the upper surface of the heating element 24, thus obtaining the compact with the heating element embedded therein.

The obtained compact is baked at 1700 to 2000° C. in an atmosphere of inert gas such as nitrogen or argon gas or in a reduced pressure atmosphere by a sintering method such as hot pressing and atmospheric sintering. The thus obtained aluminum nitride sintered body is processed. The processing is performed such that the average surface roughness (Ra) of the bonding surface (a surface in contact with the bonding agent) of the aluminum nitride sintered body is 0.1 to 2.0 µm. This can increase the strength and air tightness of the bonded portion. More preferably, the average surface roughness is 0.4 to 1.2 µm. The desired surface roughness can be obtained by processing the aluminum nitride sintered body, for example, by a surface grinding machine, a high-speed lapping machine, or the like.

(Aluminum Nitride Composite Body)

The bonding agent containing the flux and aluminum nitride powder is interposed between the plurality of aluminum nitride sintered bodies and heated at a bonding temperature of 1500° C. or less. This flux contains either calcium aluminate or calcium oxide and aluminum oxide, and the content of rare-earth elements is less than 5 wt %.

The boding agent is applied to the bonding surface of each aluminum nitride sintered body. The bonding agent may be applied to one of the aluminum nitride sintered bodies to be bonded or applied to both thereof. The bonding agent can be mixed with IPA (isopropyl alcohol), ethanol, or the like for easy application. Moreover, the bonding agent may be formed into a sheet and sandwiched between the aluminum nitride sintered bodies. The bonding agent is uniformly applied with a density of, preferably, 5 to 35 g/cm$^2$ and, more preferably, 10 to 30 g/cm$^2$.

The bonding surfaces of the aluminum nitride sintered bodies are brought into contact with each other with the bonding agent interposed therebetween and heated at a bonding temperature of 1500° C. or less in an atmosphere of inert gas such as nitrogen gas or argon gas or in a reduced-pressure atmosphere. This can provide good bonding at low bonding temperature and reduce deformation of the aluminum nitride sintered bodies. More preferably, the bonding temperature is 1400 to 1500° C. Depending on the size and shape of the aluminum nitrides intered bodies, it is preferable that the aluminum nitride sintered bodies are held at a bonding temperature of 1500° C. or less for 5 minutes to 3 hours.

Preferably, the plurality of aluminum nitride sintered bodies are pressed while the plurality of aluminum nitride sintered bodies are held at the bonding temperature with the bonding agent interposed therebetween. This can further increase the strength and air tightness of the bonded portion. The pressing may be performed during heating to the bonding temperature and cooling from the bonding temperature. The pressing is performed in such a manner that the aluminum nitride sintered bodies are pressed to each other in a direction perpendicular to the bonding surfaces. The applied pressure is, depending on the size and shape of the aluminum nitride sintered bodies, preferably 5 to 200 kg/cm$^2$.

Preferably, the aluminum nitride sintered bodies having the bonding agent interposed therebetween are heated up to the bonding temperature at a heating rate of 0.5 to 10.0° C./min. When the heating rate is less than 0.5° C./min, the flux is crystallized, and the melting point thereof increases, thus degrading the bonding properties of the aluminum nitride sintered bodies. When the heating rate is more than 10.0° C./min, the aluminum nitride composite body would be damaged in the manufacturing process, and the yield thereof is reduced.

As described above, according to the bonding agent of the embodiment and the method of manufacturing the aluminum nitride composite body using the same, it is possible to obtain good bonding at a low bonding temperature of 1500° C. or less. The obtained aluminum nitride composite body includes good bonding and less deformation of the aluminum nitride sintered bodies. Moreover, the bonding temperature is low, and it is therefore possible to reduce the energy necessary for bonding and eliminate the need for reprocessing after the bonding, thus dramatically reducing manufacturing costs.

When bonding is performed using the bonding agent of the embodiment in the process of manufacturing the heater including the heating element and the electrostatic chuck including the electrode, the bonding can be carried out at a low bonding temperature of 1500° C. or less. Accordingly, it is possible to prevent changes in quality of the heating element and the electrode and suppress changes of the volume resistivity of the aluminum nitride sintered bodies. It is therefore possible to obtain a heater excellent in temperature uniformity or an electrostatic chuck excellent in uniformity of chucking force.

EXAMPLES

Next, the present invention is described in more detail with examples, but the present invention is not limited to the following examples.

Examples 1 to 11, Comparative Examples 1 to 3

(Aluminum Nitride Sintered Body)

95 wt % of the aluminum nitride powder was added to 5 wt % of yttrium oxide as a sintering auxiliary agent and then mixed using a ball mill. The obtained powder mixture was added to the binder and granulated by spray granulation. The obtained granulated powder was molded into a plate and a pipe by die molding and CIP. The obtained plate compact and pipe compact were baked at 1860° C. for 6 hours in nitrogen gas by hot pressing and in nitrogen gas by atmospheric sintering, respectively.

In terms of size of the obtained aluminum nitride sintered bodies, the plate sintered body had 60 mm length×60 mm width and 20 mm thickness, and the pipe sintered body had 58 mm outer diameter, 20 mm inner diameter, and 20 mm length. The aluminum nitride sintered bodies were processed such that the flatness was 10 µm or less.

(Bonding Conditions)

Bonding agents shown in Tables 1 and 2 were uniformly applied to the bonding surfaces of the aluminum nitride sintered bodies such that the density of the bonding agent was 14 g/cm². The bonding surfaces of the aluminum nitride sintered bodies were brought into contact with each other with the bonding agent interposed therebetween and held at a bonding temperature of 1450° C. in nitrogen gas for 2 hours. The heating rate was set to 3.3° C./min, and nitrogen gas at 1.5 atm was introduced when the temperature reached 1200° C. The aluminum nitride sintered bodies were pressed to each other in the direction perpendicular to the bonding surface. The pressing was performed at a pressure of 40 kg/cm². The pressing started when the temperature was 1200° C., continued while the aluminum nitride sintered bodies were held at the bonding temperature of 1450° C., and ended when the aluminum nitride sintered bodies was cooled to 700° C.

(Evaluation Method)

Bonded portions of the obtained aluminum nitride composite bodies were evaluated in terms of strength, corrosive resistance, air tightness, and presence of defects. The four-point flexural strength was measured at room temperature according to JIS R1601. The strength was measured before an endurance test and a corrosion resistance test (hereinafter, referred to as an initial state) and after the endurance test and corrosion resistance test. The endurance test was performed in such a manner that a process to heat each aluminum nitride composite body to 700° C. and cool the same to room temperature was repeated for a hundred times in atmosphere.

The corrosion resistance test was performed in such a manner that each aluminum nitride composite body was held at 540° C. for 5 hours in corrosive gas atmosphere with a pressure of 0.1 Torr. This corrosive gas was made of $NF_3$ gas with a flow rate of 75 sccm and nitrogen gas with a flow rate of 100 sccm. In addition, the bonded portions were observed with a SEM (Scanning Electron Microscope) in the initial state and after the corrosion resistance test, and changes were compared. The four-point flexural strength after the endurance test and the result of the SEM observation were totally evaluated to make the evaluation of the corrosion resistance. The Tables 1 and 2 show the four-point flexural strength in the initial state and after the endurance test. In the Tables 1 and 2, the corrosion resistance was represented by three levels of "high" indicating high corrosion resistance, "low" indicating low corrosion resistance, and "intermediate" indicating intermediate corrosion resistance therebetween.

In terms of the air tightness, helium gas was introduced from the outside of each aluminum nitride composite body, and an amount of helium gas leaking from the bonded portion between the aluminum nitride sintered bodies and flowing into a pipe of the pipe sintered body was measured using a helium leak detector. Moreover, the presence of defects in the bonding portions was checked using an ultrasonic flaw detector. In the Tables 1 and 2, a ratio of a bonded area to an entire area of a portion to which the bonding agent was applied is shown.

Furthermore, to check the amount of deformation of each aluminum nitride sintered body after the bonding, flatness of the aluminum nitride composite body was measured by a three-dimensional measuring machine. The flatness was measured by 17-point measurement before and after the bonding. When the difference in flatness was 30 μm or less, deformation was judged to be small. The composition of each composite body was examined by an EDS (Energy Dispersion Spectroscopy, JED-2200, JEOL, Ltd.). The composition of the flux was analyzed by X-ray diffraction analysis.

First, fluxes of Examples 1 to 8 were prepared using calcium carbonate and calcium hydroxide as the compounds of the calcium aluminate source, calcium oxide source, and aluminum oxide source for the tests. The fluxes of Examples 1 to 8 were prepared by measuring and mixing the compounds at mixing ratios shown in Table 1. In Table 1, the mixing ratio of calcium carbonate to calcium hydroxide was shown in calcium oxide equivalent and aluminum oxide equivalent, respectively. For Comparative Examples 1 to 3, these compounds were measured and mixed at mixing ratios shown in Table 1 to prepare fluxes.

Figure 4:
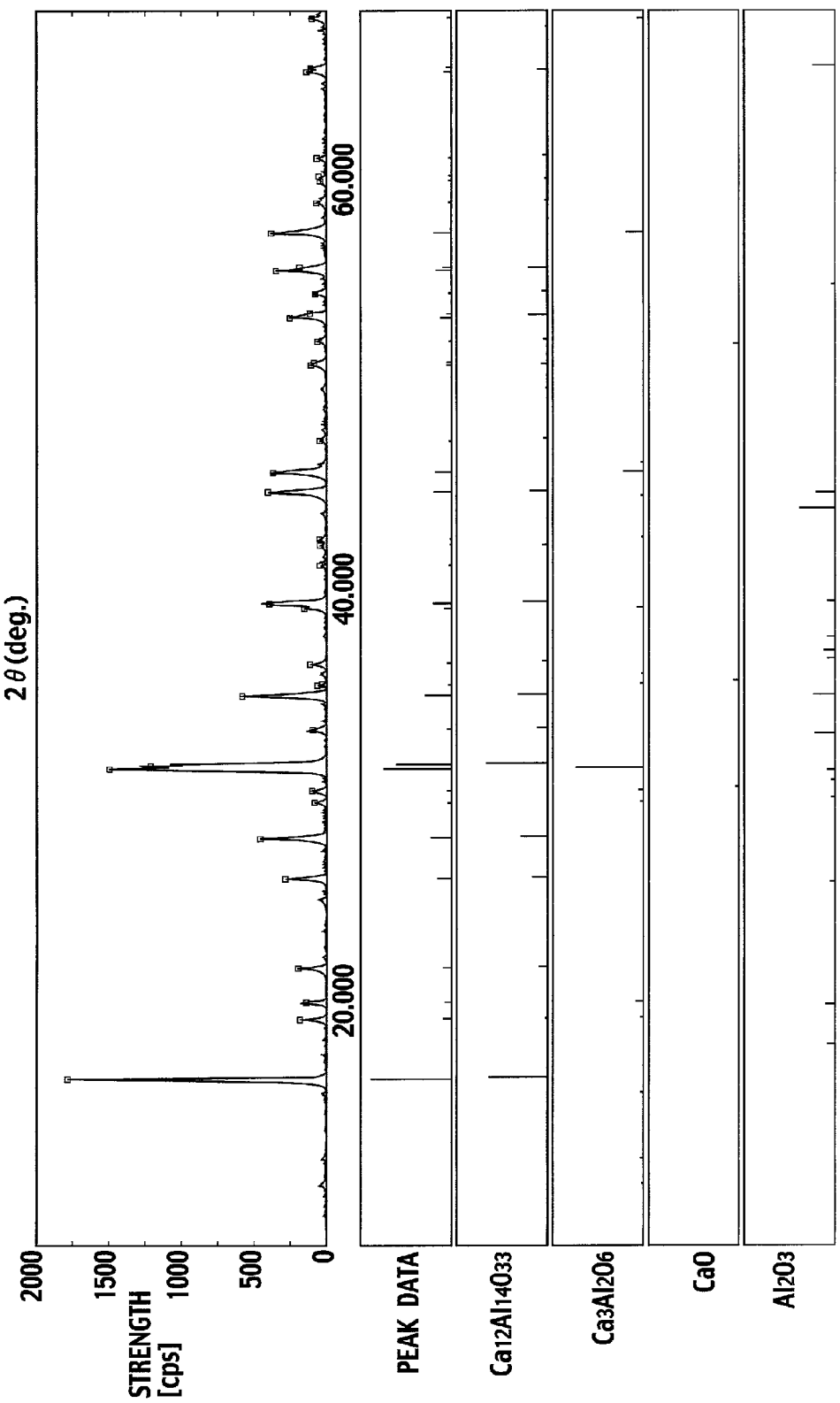
FIG. 4 is an X-ray diffraction diagram of a flux according to the embodiment of the present invention.

The mixed compounds were heated and melted in atmosphere and then put into water for cooling. The obtained products were then crushed by a ball mill so as to pass through a 32 μm sieve, thus preparing the fluxes. Moreover, aluminum nitride powder with a particle diameter of 32 μm or less was prepared. Each of the prepared fluxes and the aluminum nitride powder were measured and mixed at a ratio of the flux to aluminum nitride powder of 60 wt %/40 wt % by use of a mortar. Using the obtained bonding agent, the aluminum sintered bodies were bonded to each other under the above described bonding conditions and then evaluated by the above evaluation methods. The results thereof are shown in Table 1. The X-ray diffraction diagram of the flux prepared at a mixing ratio of Example 1 is shown in FIG. 4. In FIG. 4, the vertical axis and horizontal axis indicate strength (cps) and 2θ (deg.), respectively.

TABLE 1

| | Flux (Compound Mixing Ratio) | Four-point Flexural Strength (MPa) | | Corrosion Resistance | Air Tightness (Torr · l/sec) | Defect |
|---|---|---|---|---|---|---|
| | | Initial State | After Endurance Test | | | |
| Example 1 | CaO—$Al_2O_3$ (54 wt %/46 wt %) | 350 | 350 | High | $1 \times 10^{-8}$ or less | 90% or more |
| Example 2 | CaO—$Al_2O_3$ (51 wt %/49 wt %) | 340 | 340 | High | $1 \times 10^{-8}$ or less | 90% or more |
| Example 3 | CaO—$Al_2O_3$ (75 wt %/25 wt %) | 260 | 260 | High | $>1 \times 10^{-8}$ | Less than 50% |
| Example 4 | CaO—$Al_2O_3$ (25 wt %/75 wt %) | 240 | 240 | High | $>1 \times 10^{-8}$ | Less than 50% |
| Example 5 | CaO—$Al_2O_3$—MgO (48 wt %/51 wt %/1 wt %) | 300 | 300 | High | $1 \times 10^{-8}$ or less | 90% or more |

TABLE 1-continued

| | Flux (Compound Mixing Ratio) | Four-point Flexural Strength (MPa) | | Corrosion Resistance | Air Tightness (Torr · l/sec) | Defect |
|---|---|---|---|---|---|---|
| | | Initial State | After Endurance Test | | | |
| Example 6 | CaO—Al$_2$O$_3$—SiO$_2$ (51 wt %/41 wt %/8 wt %) | 300 | 160 | Intermediate | >1 × 10$^{-8}$ | Less than 50% |
| Example 7 | CaO—Al$_2$O$_3$—SiO$_2$ (54 wt %/45.7 wt %/0.3 wt %) | 345 | 345 | High | >1 × 10$^{-8}$ | 90% or more |
| Example 8 | CaO—Al$_2$O$_3$—SiO$_2$ (51 wt %/46 wt %/3 wt %) | 330 | 300 | High | >1 × 10$^{-8}$ | 90% or more |
| Comparative Example 1 | CaO—Al$_2$O$_3$—Y$_2$O$_3$ (43 wt %/52 wt %/5 wt %) | — | — | — | — | — |
| Comparative Example 2 | SiO$_2$—CaO—MgO (53 wt %/33 wt %/14 wt %) | 160 | 160 | Low | >1 × 10$^{-8}$ | 50% or more and less than 90% |
| Comparative Example 3 | SiO$_2$—MgO—Al$_2$O$_3$ (63 wt %/20 wt %/17 wt %) | 190 | 190 | Low | >1 × 10$^{-8}$ | 90% or more |

As shown in FIG. 4, the flux obtained by mixing and melting calcium carbonate and calcium hydroxide at the mixing ratio of Example 1 contained Ca$_{12}$Al$_{14}$O$_{33}$ and Ca$_3$Al$_2$O$_6$ as calcium oxide, aluminum oxide, and calcium aluminate. The same applied to Examples 2 to 4.

As shown in Table 1, Examples 1 to 4 used the fluxes containing calcium oxide and aluminum oxide but not containing any other oxides. In the aluminum nitride composite bodies of Example 1 to 4, the strength at bonded portions was high in the initial state and was not reduced after the endurance test.

In terms of the aluminum nitride composite bodies of Examples 1 and 2 using the fluxes which were obtained by mixing 40 to 60 wt % calcium carbonate (calcium oxide equivalent) and 40 to 60 wt % calcium hydroxide (aluminum oxide equivalent) and had a calcium content of 45 to 70 wt % and an aluminum content of 30 to 55 wt %, the four-point flexural strength was as high as approx. 300 MPa both in the initial state and after the endurance test. The composition of the bonding layer of Example 1 is 25 wt % nitrogen, 13 wt % oxygen, 51 wt % aluminum, 8 wt % calcium, and 3 wt % yttrium. The composition of the bonding layer of Example 2 is 17 wt % nitrogen, 32 wt % oxygen, 26 wt % aluminum, 17 wt % calcium, and 8 wt % yttrium.

In the aluminum nitride composite bodies of Examples 1 to 4, no corrosion was observed and the strength was not reduced even after the corrosion resistance test. The aluminum nitride composite bodies of Examples 1 to 4 were therefore excellent in corrosion resistance. In the aluminum nitride composite bodies of Examples 1 to 2, the leak amounts were suppressed to 1×10$^{-8}$ Torr·l /sec or less to show high air tightness at the bonded portions. Moreover, in the aluminum nitride composite bodies of Examples 1 to 2, no defects were observed at the bonded portions, and the bonding was very good.

Also the aluminum nitride composite bodies of Examples 5 to 8, which used bonding agents including the fluxes containing calcium aluminate, calcium oxide, and aluminum oxide and further containing less than 10 wt % of magnesium oxide or silica as the oxide other than the above oxides, had high strength in the initial state. Example 5 using the flux containing magnesium oxide, especially, was not reduced in strength after the endurance test and had excellent endurance. Moreover, Example 5 had excellent corrosion resistance and air tightness and included no defects observed at the bonded portion. In terms of the aluminum nitride composite bodies of Examples 7 and 8 with silica contents of 0.01 to 5 wt %, the four-point flexural strength was as high as about 300 Mpa in the initial state. Examples 7 and 8 were not reduced in strength after the endurance test and had excellent endurance. The corrosion resistance thereof was very high. As described above, it was found that even the flux containing an oxide other than calcium aluminate, calcium oxide, and aluminum oxide can provide good bonding at low bonding temperature.

The aluminum nitride composite bodies of Examples 1 to 8 were all deformed only slightly by bonding. The SEM observation in the initial state revealed that the bonding layers had thicknesses of 10 to 80 μm and uniform texture could be obtained.

On the contrary to these Examples 1 to 8, Comparative Example 1, which used the bonding agent including the flux prepared by mixing calcium oxide, aluminum oxide, and 5 wt % yttrium oxide, could not bond the aluminum nitride sintered bodies to each other at a bonding temperature of 1450° C.

In Comparative Examples 2 and 3, which used the bonding agents including the fluxes prepared by not mixing one of calcium oxide and aluminum oxide, the aluminum nitride sintered bodies could be bonded to each other but had very low strength at the bonded portions. Furthermore, the aluminum nitride composite bodies of Comparative Examples 2 and 3 had less corrosion resistance. Moreover, the aluminum nitride composite bodies of Comparative Examples 2 and 3 had leak amounts more than 1×10$^{-8}$ Torr–l/sec and were less airtight. In Comparative Examples 2 and 3, corrosion of silicon (Si) contained in the fluxes was observed by the SEM.

Figure 5:
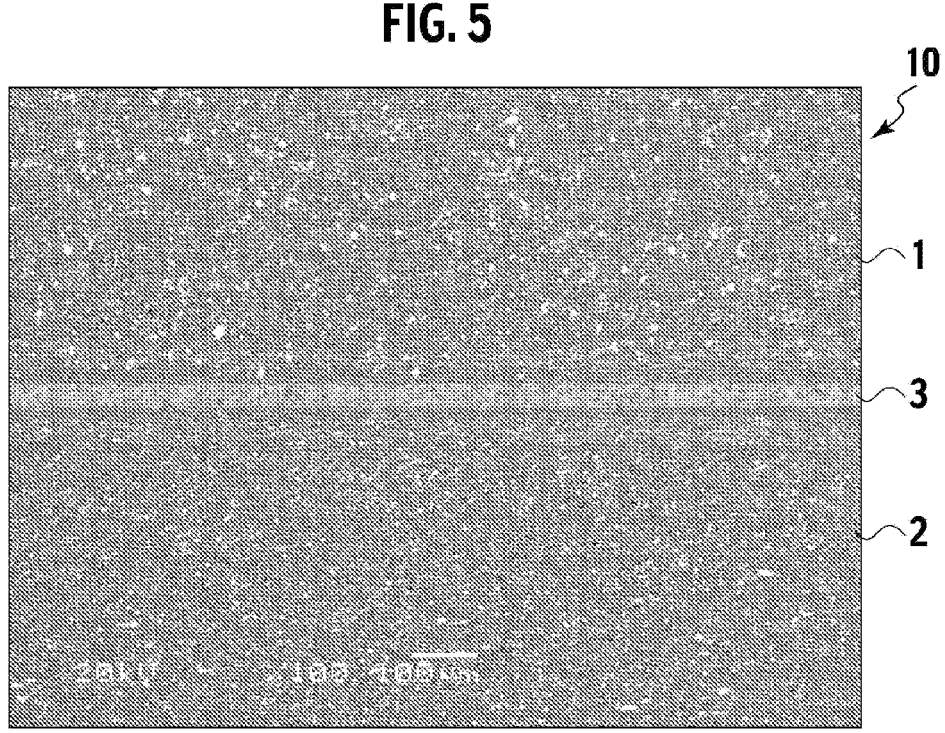
FIG. 5 is a drawing-substitute photograph showing a result of SEM observation of a composite body according to the embodiment of the present invention.
Figure 6:
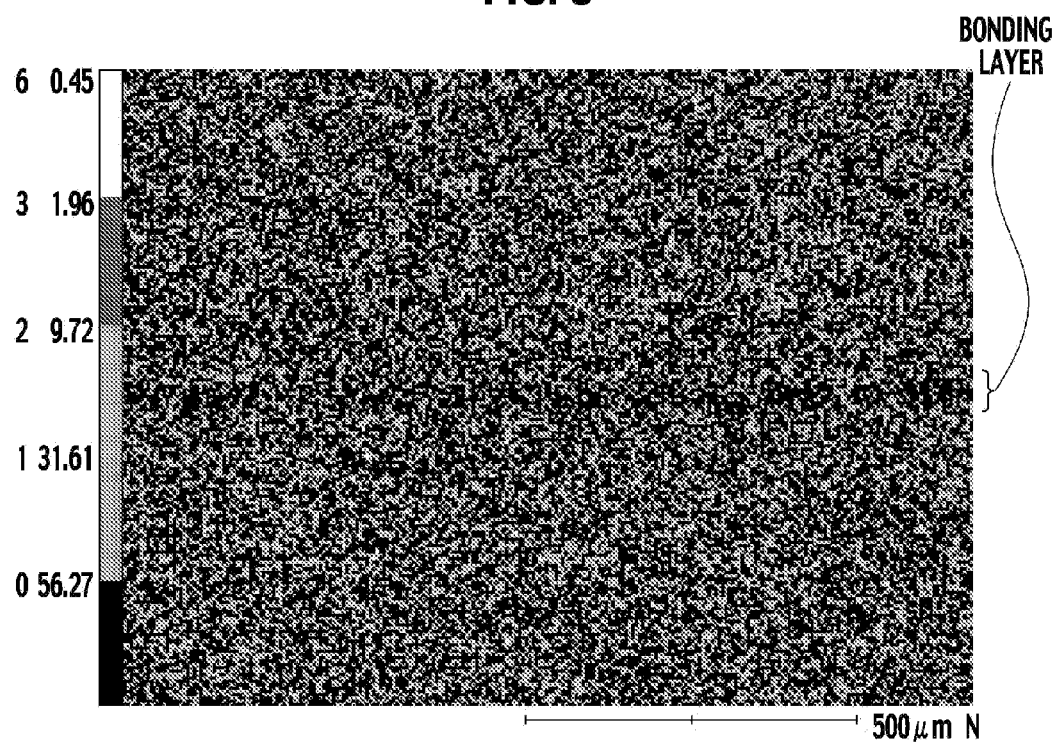
FIG. 6 is a drawing-substitute photograph showing a result of an EDS analysis of a nitrogen distribution of the composite body according to the embodiment of the present invention.
Figure 7:
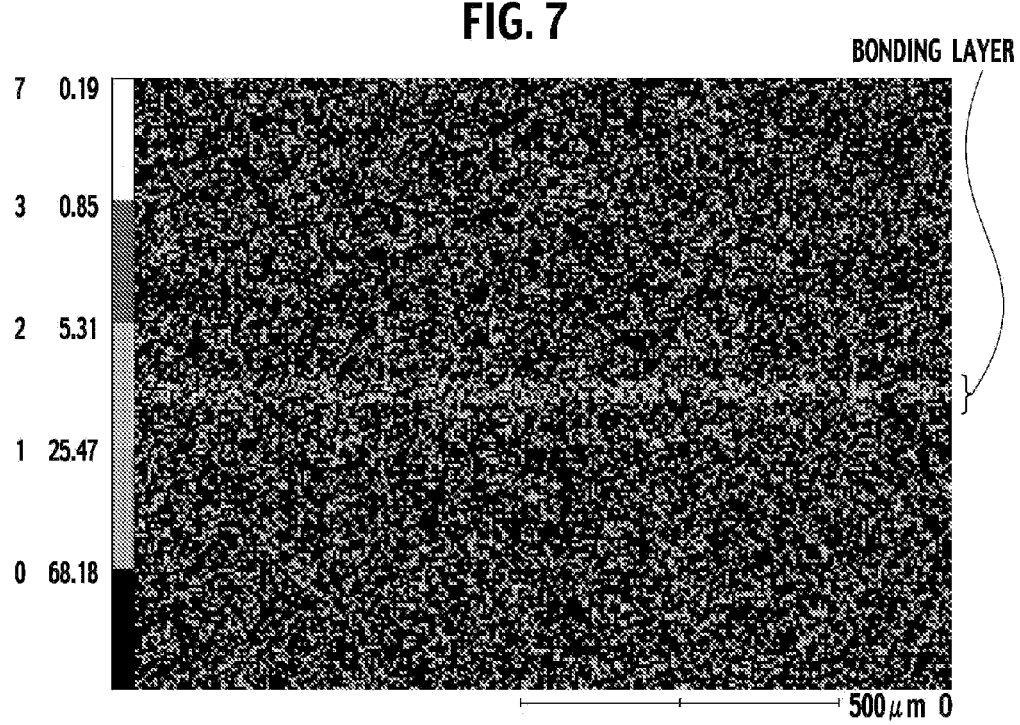
FIG. 7 is a drawing-substitute photograph showing a result of an EDS analysis of an oxygen distribution of the composite body according to the embodiment of the present invention.
Figure 8:
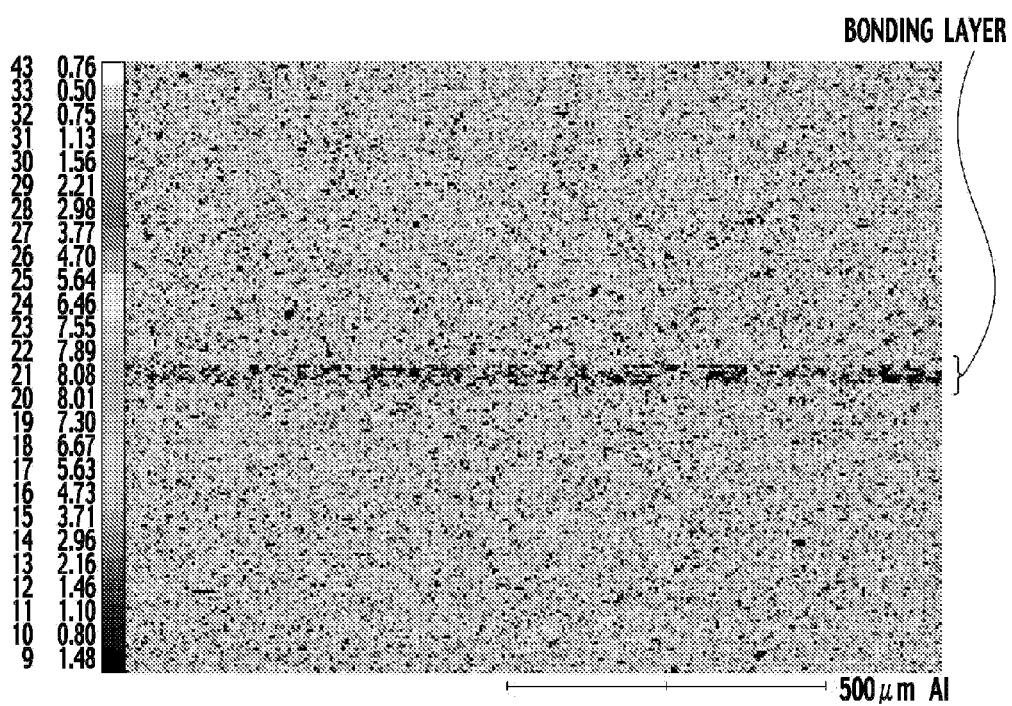
FIG. 8 is a drawing-substitute photograph showing a result of an EDS analysis of an aluminum distribution of the composite body according to the embodiment of the present invention.
Figure 9:
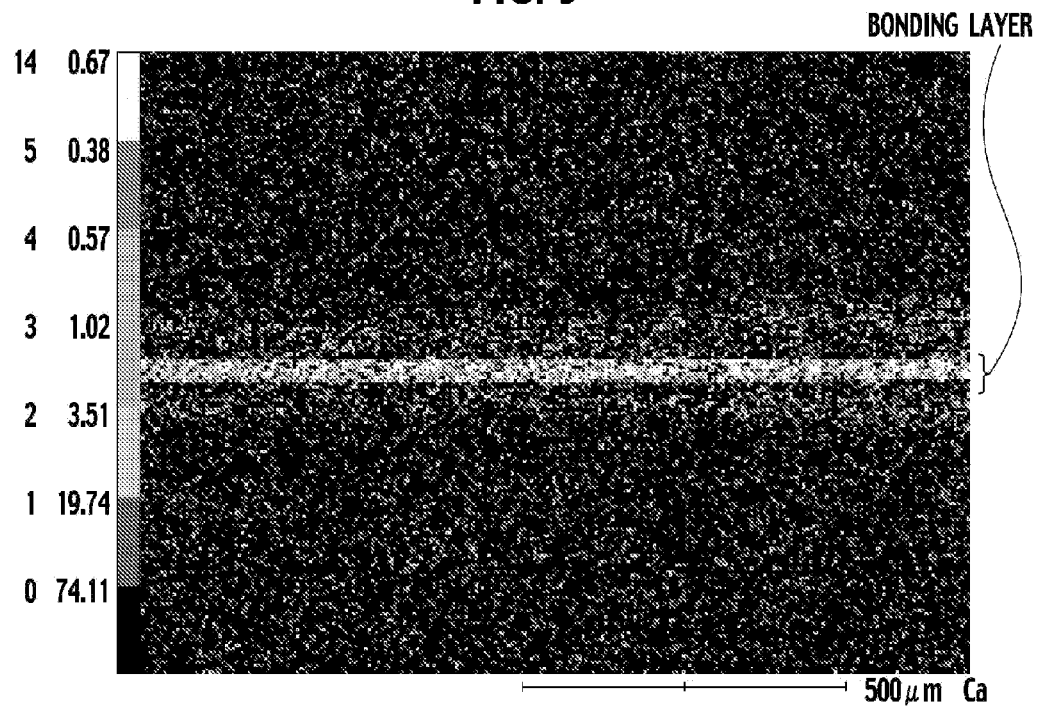
FIG. 9 is a drawing-substitute photograph showing a result of an EDS analysis of a calcium distribution of the composite body according to the embodiment of the present invention.
Figure 10:
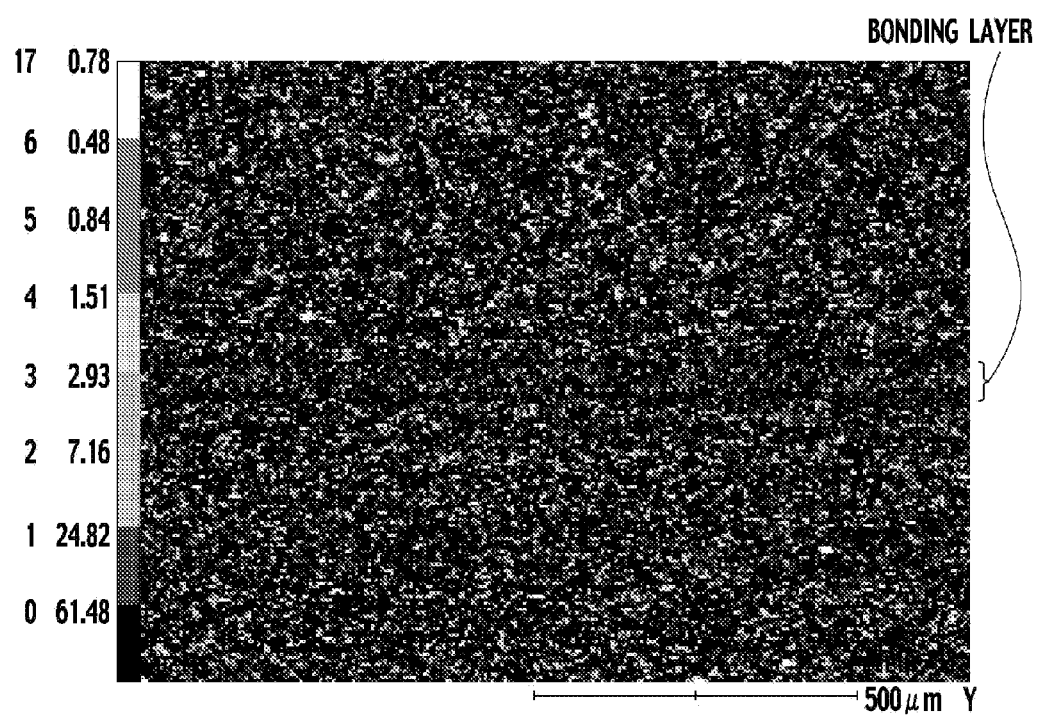
FIG. 10 is a drawing-substitute photograph showing a result of an EDS analysis of an yttrium distribution of the composite body according to the embodiment of the present invention.

Furthermore, FIG. 5 shows a SEM photograph of the composite body of Example 1. As shown in FIG. 5, the bonding agent of Example 1 can provide the composite body 10 including the aluminum nitride sintered bodies 1 and 2 firmly bonded to each other with the bonding layer 3 interposed therebetween. FIGS. 6 to 10 show results of the EDS analysis of the composition of the composite body of Example 1.

TABLE 2

| | Bonding Agent composition(wt %) | | Four-point Flexural Strength (MPa) | | Corrosion Resistance | Air Tightness (Torr · l/sec) | Defect |
|---|---|---|---|---|---|---|---|
| | Flux | AlN Powder | Initial state | After Endurance test | | | |
| Example 1 | 60 | 40 | 350 | 350 | high | $1 \times 10^{-8}$ or less | 90% or more |
| Example 9 | 70 | 30 | 345 | 345 | high | $1 \times 10^{-8}$ or less | 90% or more |
| Example 10 | 95 | 5 | 240 | 230 | high | $>1 \times 10^{-8}$ | 50% or more and less than 90% |
| Example 11 | 5 | 95 | 230 | 230 | high | $>1 \times 10^{-8}$ | less than 50% |

As shown in Table 2, aluminum nitride composite bodies of Examples 1 and 9 to 11 had high strength at bonded portions in the initial state, and the strength was not reduced after the endurance test. The aluminum nitride composite bodies of Example 1 and 9 to 11 were excellent in corrosion resistance. As described above, good bonding could be obtained at low bonding temperature with various ratios of the flux to aluminum nitride powder.

The aluminum nitride composite bodies of Examples 1 and 9 containing 10 to 90 wt % of the flux and 10 to 90 wt % of the aluminum nitride powder, especially, had four-point flexural strengths of about 350 Mpa both in the initial state and after the endurance test and were the highest in strength. Moreover, the aluminum nitride composite bodies of Examples 1 and 9 achieved best bonding with high air tightness at the bonded portions and no defects observed at the bonded potions.

Example 12

The heater 20 shown in FIG. 2 was manufactured. A compact for the disk member 21 was formed using the granulated powder obtained in the same way as that of Examples 1 to 11 by die molding, and a compact for the pipe member 22 was formed by CIP. In the compact for the disk member 21, the heating element 24 which was coil-shaped and made of molybdenum was embedded. The obtained compact was baked at 1860° C. in nitrogen gas by hot pressing for 6 hours. In terms of size of the obtained aluminum nitride sintered bodies, the disk member 21 had 340 mm diameter and 20 mm thickness, and the pipe member 22 had 70 mm outer diameter, 60 mm inner diameter, and 180 mm length. The placement surface 21a of the disk member 21 was processed to have a flatness of 10 μm or less.

The bonding agent of Example 1 shown in Tables 1 and 2 was uniformly applied to the end surface 22a of the pipe member 22 such that the density of the bonding agent was 18 g/cm². The back surface 21b of the disk member 21 and the end surface 22a of the pipe member 22 were brought into contact with each other with the bonding agent interposed therebetween and then heated under the conditions similar to those of Examples 1 to 11 while being pressed. Ends of the heat element 24 were brazed with ends of the power supply members 25, thus obtaining the heater 20.

The flatness of the placement surface 21a of the obtained heater 20 was measured by a three dimensional measuring machine. The flatness was measured by 13-point measurement before and after the bonding, and the difference in flatness was calculated. The difference was 30 μm or less, and the deformation thereof was found to be suppressed to a small extent. Moreover, measurement of differences in in-plane temperature in the placement surface 21a revealed that the variation of the temperature differences on concentric circles before and after the bonding was suppressed within ±0.5° C. The temperature uniformity thereof was therefore excellent. The measurement of the four-point flexural strength at room temperature according to JIS R1601 revealed that the strength was not reduced even by brazing and good bonding was maintained.

Although the inventions have been described above by reference to certain embodiments of the inventions, the inventions are not limited to the embodiments described above will occur to those skilled in the art, in light of the above teaching.

What is claimed is:

1. A method of manufacturing an aluminum nitride composite body, comprising:
    a single heating step of heating a plurality of aluminum nitride sintered bodies with a bonding agent interposed therebetween at a bonding temperature, wherein said bonding temperature of said single heating step does not exceed 1500° C. overall; and
    bonding the plurality of aluminum nitride sintered bodies to one another by performing cooling after said single heating step;
    wherein the bonding agent contains a flux and aluminum nitride powder, wherein the flux consists essentially of either calcium aluminate or calcium oxide and aluminum oxide, and wherein the flux does not include any rare earth elements.

2. The method of manufacturing an aluminum nitride composite body according to claim 1, wherein during the single heating step, the plurality of aluminum nitride sintered bodies with the bonding agent interposed therebeween are heated to the bonding temperature at a heating rate of 0.5 to 10.0° C./min.

3. The method of manufacturing an aluminum nitride composite body according to claim 1, wherein an average surface roughness of a bonding surface of each of the aluminum nitride sintered bodies is 0.1 to 2.0 μm.

4. The method of manufacturing an aluminum nitride composite body according to claim 1, wherein the flux further consists essentially of 0.01 to 5 wt % silica with respect to a total of 100 wt % of flux in the bonding agent.

5. The method of manufacturing an aluminum nitride composite body according to claim 1, wherein the content of the flux is 10 to 90 wt % and the content of the aluminum nitride powder is 10 to 90 wt % with respect to a total of 100 wt % in the bonding agent.

6. The method of manufacturing an aluminum nitride composite body according to claim 1, wherein maximum particle diameters of the flux and the aluminum nitride powder are 45 μm or less.

* * * * *